United States Patent
Laffitte et al.

(10) Patent No.: US 8,197,605 B2
(45) Date of Patent: Jun. 12, 2012

(54) USE OF ALKANESULFONIC ACID AS AGENT FOR CLEANING CEMENT, MORTAR AND CONCRETE

(75) Inventors: Jean-Alex Laffitte, Pau (FR); Bernard Monguillon, Mourenx (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/811,433

(22) PCT Filed: Nov. 30, 2009

(86) PCT No.: PCT/FR2009/052340
§ 371 (c)(1),
(2), (4) Date: Aug. 30, 2010

(87) PCT Pub. No.: WO2010/063933
PCT Pub. Date: Jun. 10, 2010

(65) Prior Publication Data
US 2010/0313908 A1  Dec. 16, 2010

(30) Foreign Application Priority Data
Dec. 1, 2008  (FR) ..................... 08 58162

(51) Int. Cl.
*C23G 1/02* (2006.01)
(52) U.S. Cl. ............... 134/3; 134/2; 134/26; 134/28; 134/30; 134/34; 134/35; 134/36; 134/41; 134/42; 510/109; 510/240; 510/426; 510/428; 510/495; 510/498

(58) Field of Classification Search .......... 510/109, 510/240, 426, 428, 495, 498; 134/2, 3, 26, 134/28, 30, 34, 35, 36, 41, 42
See application file for complete search history.

(56) References Cited

U.S. PATENT DOCUMENTS
5,451,264 A  9/1995 James, Jr.

FOREIGN PATENT DOCUMENTS
| AU | 708209 B2 | 7/1999 |
|---|---|---|
| FR | 2774371 A | 8/1999 |
| GB | 1362783 A | 8/1974 |

OTHER PUBLICATIONS
International Search Report received in PCT/FR2009/052340, mailed Apr. 6, 2010.

*Primary Examiner* — Bibi Carrillo
(74) *Attorney, Agent, or Firm* — Smith, Gambrell & Russell, LLP

(57) ABSTRACT

The present invention relates to the use of at least one alkanesulfonic acid of formula $R-SO_3H$, in which R represents a saturated, linear or branched, hydrocarbon chain containing 1 to 4 carbon atoms, as agent for cleaning cement, mortar, concrete, lime, laitance and other derived products. The invention also relates to a method of cleaning cement, mortar, concrete, lime, laitance and other derived products using at least one alkanesulfonic acid.

20 Claims, No Drawings

USE OF ALKANESULFONIC ACID AS AGENT FOR CLEANING CEMENT, MORTAR AND CONCRETE

The present invention relates to the field of the cleaning of cement, mortar, concrete, laitances, lime and others. More particularly, the invention relates to the use of an alkanesulfonic acid for removing contaminants due to cement, mortar, concrete, lime and their laitances on all types of surfaces.

In order to remove residues, in particular dried residues, of cement, mortar and concrete on surfaces, in particular cement mixers, formwork, tools, containers and pipes, and the laitances of these products, for example on floors, and other cemented or concreted works, the solutions existing today are, among the main ones, mechanical actions (hammers, pick hammers, brushes, spatulas, scrapers, and the like) and chemical actions, in particular washing operations with acids.

The most commonly used acid in this application is hydrochloric acid, which dissolves lime, cement, mortar, concrete and other mixtures comprising cement and/or lime, in particular laitances of lime and of cement, and descales in a single operation, while optionally making it possible to dispense with any mechanical operation.

Despite its effectiveness, hydrochloric acid however exhibits numerous disadvantages, among which may be mentioned the release of toxic, nauseating, irritant and lacrimatory vapors and problems of effluents due to the large amounts of chlorides discharged to the environment.

Furthermore, due to its chemical nature, the concentration of hydrochloric acid is limited to approximately 37%, whereas it might be advantageous, indeed even desirable, to have available much higher concentrations of acids in order to remove in particular dry residues of concrete, cement, mortar, lime, laitances and others.

Yet other acids are used, such as, for example, phosphoric acid, for which the discharges of phosphates represent a major problem for the environment. Specifically, the use of phosphoric acid is today disputed due to the discharges of phosphates which it brings about.

Likewise, sulfamic acid, the discharges of which are also regarded as toxic to the environment, in particular for aquatic organisms, cannot be used to remove dirty marks due to mortar, cement, concrete and others.

The use has also been envisaged of organic acids, such as, for example, acetic acid, citric acid, oxalic acid, glycolic acid, lactic acid, formic acid and the like.

However, as their acidity is lower than that of the abovementioned mineral acids, they have a lower effectiveness which requires the use of larger amounts of products.

In addition, some acids exist in the solid form, which results in difficulties in handling and formulating (pulverulent powders), and for this reason are not preferred acids for the use of the present invention. Furthermore, some of these organic acids are regarded as toxic. This is in particular the case with oxalic acid and glycolic acid.

A need thus remains for products which make it possible to be released from the disadvantages listed above, in particular acids which make it possible to effectively remove residues and laitances, in particular dry residues, dry laitances, of lime, cement, mortar and concrete and other compounds based on a mineral binder, while protecting the environment, that is to say which are in accordance with the environmental standards in force, and which do not exhibit the disadvantages related in particular to releases of irritant gases related to the use of hydrochloric acid.

Thus, a first object of the present invention consists in providing an effective alternative to the use of hydrochloric acid in cleaning surfaces contaminated by concrete, mortar, cement, lime and laitances, and others, on all types of surfaces, in particular on metal surfaces (for example of steel type) or surfaces made of concrete, cement, ceramic, stone, wood, board, polymers, varnishes, paints, lacquers, glass and others.

Another object of the present invention consists in providing an effective alternative to the acids commonly used in this application while avoiding discharges and effluents which are harmful to the environment, and also releases of toxic and nauseous gases.

Other objects and advantages will become apparent in the course of the description of the present invention which follows. These objects are achieved in all or in part by virtue of the present invention.

This is because the Applicant Company has now discovered that it is possible to clean or strip in an effective manner surfaces contaminated by concrete, mortar, cement and laitances, and others, it being possible for such surfaces to be of all types, without exhibiting the abovementioned disadvantages, in particular the disadvantages with regard to the environment, the disadvantages related to releases of gases and others, as will now be described.

It has thus been discovered that it is possible to efficiently remove cement, mortar, concrete, lime, their laitances and other products based on a mineral binder by using a formulation based on at least one alkanesulfonic acid.

The formulations based on at least one alkanesulfonic acid exhibit in particular an improved effectiveness with respect to hydrochloric acid, widely used normally in this field.

Alkanesulfonic acids exhibit the advantage, first, of being less corrosive than hydrochloric acid, of not generating chlorides, of being biodegradable and of not giving off toxic or nauseating products, and also of being less polluting than phosphoric acid, due to the phosphates discharged to the environment. In addition, alkanesulfonic acids can be used in a more concentrated form than hydrochloric acid.

The invention also relates to a method for removing cement, mortar, concrete, lime and laitances of these various products, and also any other product based on a mineral binder, such as, for example, reinforced concrete.

The invention thus relates to a method for removing said cement, mortar, concrete and others, whether in the wet or dried form, for example in the bulk form or also present on all types of surfaces, in particular metal surfaces (iron, aluminum, steel and others) or surfaces made of wood, polymers (plastics, paints, lacquers, varnishes), glass, stone, ceramic, porcelain, terracotta and others.

The use of the present invention finds entirely advantageous applications in the fields of cement works (concrete plants, cement mixers, truck mixers, pipes, tools and others) or of construction (walling units, tools, formwork, tiling, floors, paths and routes suitable for vehicles, such as sidewalks, roads, runways and others).

This is because formulations based on alkanesulfonic acid(s) exhibit in particular a greater ease of use and of handling in comparison with the hydrochloric acid normally used for the removal of cement, concrete, mortar and others. Specifically, the use of formulations based on alkanesulfonic acid(s) does not produce or produces little in the way of releases of toxic, irritant or lacrimatory gases.

Thus, according to a first subject matter, the invention relates to the use of at least one alkanesulfonic acid as agent for cleaning cement, mortar, concrete, lime and other derived products based on a mineral binder. More particularly, the invention relates to the use of at least one alkanesulfonic acid in the cleaning of surfaces contaminated by concrete, mortar, cement and laitances, and others, on all types of surfaces, as indicated above.

More specifically, the present invention provides a replacement product, in particular for replacement of hydrochloric acid, for the cleaning of concrete, mortar, cement and others, said replacement product being biodegradable, relatively nontoxic, not releasing or releasing little in the way of irritant or lacrimatory gases, not generating effluents harmful to the environment and being able to be used in a more concentrated form than hydrochloric acid.

Cement is well known to a person skilled in the art and results, after mixing with water and drying, in a more or less compact solid product. A cement is thus a mineral binder with a more or less complex composition and, within the meaning of the present invention, the cement can be any mineral binder, such as quick-setting cement, Portland cement, lime, pozzolana or clay, but also any binder capable of binding hard substances together.

Mortar is obtained by mixing cement(s) with more or less large amounts of aggregates in the form of sand or other bits of grit with a small particle size. Concrete corresponds to mixtures of cement(s) and/or of mortar(s) with more or less large amounts of aggregates.

During the preparation of cement, mortar and concrete, the formation of whitish residues is sometimes observed, generally at the surface, which residues are referred to as laitances and which may also be removed by virtue of the use according to the present invention.

The use of the present invention also makes possible the cleaning of derived products of cement, mortar, concrete, lime and their laitances. The term "derived products" is understood to mean any solid product obtained from a mixture of water and cement and/or lime.

In the continuation of the present account, use will more simply be made of the term "cement" to denote any product capable of being obtained from mixtures of water and cement and/or lime, in particular cements, mortars, concretes, limes or laitances of said products, and also their derived products.

Within the meaning of the present invention, the term "cleaning" is understood to mean the cleaning or the stripping of all types of surfaces, as indicated above, contaminated, coated or covered, in all or in part, with residues, scales or deposits, dry or still wet, generated during the use or the preparation of cement-based products and in particular cement, mortar or concrete but also laitances of cement, mortar or concrete, lime, laitances of lime, and derived products, by removal or dissolution of said residues, scales or deposits.

The term "cleaning" also encompasses the partial or complete removal of cement and derived products which may have set solid, in an unforeseen or undesirable manner, in various containers, such as cement mixers, formwork and others, and which are usually removed by mechanical means, such as hammers, pick hammers and others.

In the present invention the term "alkanesulfonic acid" is understood to mean preferably alkanesulfonic acids of formula R—SO$_3$H, where R represents a saturated and linear or branched hydrocarbon chain comprising from 1 to 4 carbon atoms.

The alkanesulfonic acids which can be used in the context of the present invention are chosen in particular from methanesulfonic acid, ethanesulfonic acid, n-propanesulfonic acid, isopropanesulfonic acid, n-butanesulfonic acid, isobutanesulfonic acid, sec-butanesulfonic acid, tent-butanesulfonic acid and the mixtures of two or more of them in all proportions.

According to a preferred embodiment, the alkanesulfonic acid used in the context of the present invention is methanesulfonic acid or ethanesulfonic acid; entirely preferably, the acid used is methanesulfonic acid.

Thus, the use according to the present invention employs at least one alkanesulfonic acid chosen from alkanesulfonic acids possessing a linear or branched chain comprising from 1 to 4 carbon atoms and preferably at least methanesulfonic acid (MSA).

Any type of formulation comprising at least one alkanesulfonic acid may be suitable. As a general rule, the formulation comprises from 0.01% to 100% by weight of alkanesulfonic acid, more generally from 0.05% to 90% by weight, and in particular from 0.5% to 75% by weight of alkanesulfonic acid(s).

The concentration of alkanesulfonic acid(s) in the formulation depends on many factors, among which may be mentioned the amount of cement to be cleaned, the nature and the form of the surface to be cleaned, the temperature at which the formulation is applied and others. A person skilled in the art will know how to adjust the concentration of acid in the formulation without excessive efforts.

Preference is given to concentrated solutions, for, example of 60% to 100% by weight, preferably approximately from 70% to 100% by weight, of alkanesulfonic acid, with respect to the total weight of said formulation, when it is desired to remove large amounts of cement or at the surface of materials which are relatively insensitive to acid attacks. Preference is given to less concentrated solutions, of 0.01% to 60%, preferably from 0.05% to 50%, for smaller amounts of cement to be removed or for the cleaning of laitances on surfaces, in particular on surfaces sensitive to acid attacks.

The formulation is, for example, an aqueous, organic or aqueous/organic formulation. The formulation can be prepared in the form of a concentrated mixture or concentrate which can be diluted by the final user. In an alternative form, the formulation can also be a ready-for-use formulation, that is to say that it does not have to be diluted. Finally, within the meaning of the present invention, the formulation can be a pure alkanesulfonic acid or also a mixture of pure alkanesulfonic acids, that is to say that the formulation comprises only one or more alkanesulfonic acids, without other formulation additive or other solvent or diluent.

Use may be made, for example, of methanesulfonic acid in aqueous solution sold by Arkema under the name Scaleva® or also under the name Lutropur® sold by BASF, ready-for-use or diluted with water in the proportions indicated above.

In addition to the alkanesulfonic acid or acids, the formulation used in the present invention can optionally comprise one or more additives, such as those chosen from:

hydrotropic or solubilizing agents or solvents (for example alcohols, esters, ketones, amides and others), biocides or disinfectants (bromoacetic acid, peracetic acid, aqueous hydrogen peroxide solution and others), rheological or texturizing or thickening or gelling agents (sugars, polysaccharides, alginates, silica, amorphous silica, gums and others), organic or inorganic acids (for example sulfuric acid, phosphoric acid, nitric acid, sulfamic acid, acetic acid, citric acid, formic acid, lactic acid, glycolic acid, oxalic acid and other acids), salts of alkali metals, of alkaline earth metals or of other metals, in particular alkali metal and/or alkaline earth metal fluorides, chlorides, iodides or bromides, preferably chlorides and fluorides, more preferably fluorides, in particular sodium fluoride or calcium fluoride, flame retardants, preservatives, surfactants of anionic, cationic, nonionic or amphoteric type (such as ethoxylated alcohols and/or amines, or alkyl- and/or arylsulfonates), emulsifiers, detergents, soaps and others;

foaming or antifoaming agents, antifreezes (for example ethylene glycol, propylene glycol and others);

colorants, fragrances or odorous agents, and other additives known to a person skilled in the art.

According to an alternative form, the formulation is a formulation in the gel form. This is because it has been observed that the formulations in the gel form of alkanesulfonic acid(s) are very effective in the removal of cement-based contaminants, as described above, not only due to the gel itself, which makes possible a longer action of the acid active principle (the gel "adheres" for a longer time to the surfaces, in comparison with an aqueous formulation), but also exhibits an improved cleaning power, in comparison with other gel formulations.

Thus, according to another aspect, the present invention relates to the use of a formulation in the gel form comprising:

from 0.01% to 97% by weight, preferably from 0.05% to 75% by weight and more particularly from 0.5% to 70% by weight of at least one alkanesulfonic acid, preferably methanesulfonic acid;

from 0.1% to 30% by weight, preferably from 0.5% to 15% by weight and more particularly from 1% to 10% by weight of at least one gelling agent;

from 0.1% to 30% by weight, preferably from 0.5% to 15% by weight, of at least one additive chosen from those mentioned above; and the remainder to 100% of water and/or organic solvent.

The gelling agents and the surfactants which can be used in the formulations in the gel form can be of any type. A person skilled in the art will know how, without particular difficulty and drawing inspiration from the following examples, to choose and adapt the nature of the gelling agents and surfactants which are appropriate.

According to another aspect, the present invention relates to the use of a formulation in the foaming gel form. This is because foaming gels are very particularly advantageous due to the fact that they produce a clinging foam, in other words a foam which adheres to the contaminated surfaces, while requiring a reduced consumption of cleaning acid active material, and exhibit the advantage of a better ability to be rinsed off, that is to say simpler and more efficient removal, while requiring a smaller amount of water.

Thus, the present invention also relates to the use of a formulation in the foaming gel form comprising:

from 0.01% to 97% by weight, preferably from 0.05% to 75% by weight and more particularly from 0.5% to 70% by weight of at least one alkanesulfonic acid, preferably methanesulfonic acid;

from 0.1% to 30% by weight, preferably from 0.5% to 15% by weight and more particularly from 1% to 10% by weight of at least one foaming agent;

from 0% to 30% by weight, preferably from 0.5% to 15% by weight and more particularly from 1% to 10% by weight of at least one gelling agent;

from 0% to 30% by weight, preferably from 0.5% to 15% by weight, of at least one additive chosen from those mentioned above, including preferably from 0% to 10% by weight, preferably from 0.1% to 5% by weight, of a solubilizing or hydrotropic agent and from 0% to 20% by weight, preferably from 0.5% to 10% by weight, of at least one surfactant; and the remainder to 100% of water and/or organic solvent.

Depending on the field and the method of application, the formulation can be prepared in the concentrate form and with a low appropriate viscosity and can then be diluted before use until the expected effectiveness with regard to the viscosity and the foaming power is obtained.

In the above foaming gel formulation, the foaming agent can be chosen from the foaming agents commonly used by a person skilled in the art and preferably from amine oxides, such as, for example:

dimethylalkylamine oxides, the alkyl chain being a "fatty" chain comprising, for example, from 10 to 30 carbon atoms, preferably from 12 to 22 carbon atoms;

ethoxylated amine oxides; and mixtures of two or more of them.

The use of at least one ethoxylated amine oxide, such as, without implied limitation, Cecajel® OX100 from Ceca or Aromox® T12 from Akzo, alone or in combination with at least one dimethylalkylamine oxide, makes it possible to contribute stability to the foaming gel.

Foaming gels, in particular those described above, generally form gels when they are mixed with water, that is to say that they increase the viscosity of the formulation without it being necessary to add a gelling agent. However, the addition of such a gelling agent is not excluded from the present invention.

Mention may be made, among solubilizing or hydrotropic agents which can be used in the formulations according to the invention, by way of example and without implied limitation, of sodium xylene- or cumenesulfonates. However, such agents are not essential in the acid formulations according to the invention.

An aqueous, organic or aqueous/organic formulation in the solution or gel form or also in the foaming gel form which is particularly preferred is a formulation comprising from 0.01% to 95% by weight, preferably from 0.05% to 75% by weight and more preferably from 0.5% to 50% by weight of methanesulfonic acid.

The formulations used according to the present invention, whether in the liquid, gel or foaming gel form and in the concentrated or diluted form, can be applied according to any method known to a person skilled in the art and in particular under pressure or also using a spray gun.

The concentration of alkanesulfonic acid(s) can thus vary within very wide limits according to the nature and the amount of the cement to be removed, but also as a function of the nature of the surfaces to be cleaned.

According to another aspect, the present invention relates to a method for removing cement, mortar, concrete, lime, laitances and derived products as defined above, for example present in the form of dry or wet residues, scales or deposits, generated during the use or the preparation of cement-based products, comprising at least one stage in which an effective amount of at least one alkanesulfonic acid as defined above, preferably methanesulfonic acid, in the form of aqueous, organic or aqueous/organic formulations in the solution, gel or foaming gel form, as have just been described, is brought into contact with the cement, mortar, concrete, lime, laitances and derived products to be removed, by contact, immersion, sprinkling, spraying or application of a more or less thick layer, optionally using appropriate tools known to a person skilled in the art (brushes, including fine brushes, spatulas and others), said stage of bringing into contact being optionally followed by one or more stages of rinsing and/or drying.

The temperature at which the method is carried out can vary within wide limits and is generally between −20° C. and +150° C., preferably between 0° C. and 80° C., more preferably between 10° C. and 80° C. According to a preferred embodiment, the operating temperature is ambient temperature or a temperature between ambient temperature and approximately 80° C.

It is thus possible to envisage bringing to temperature the alkanesulfonic acid and the surface to be treated, it being possible for this temperature to be identical or different, or to bring to temperature either the alkanesulfonic acid or the surface to be treated.

It is thus possible to treat externally surfaces contaminated by cements at ambient temperature (for example 10° C.) using a formulation of alkanesulfonic acid(s) brought to 70° C. or also to treat surfaces contaminated by cement residues at a high temperature (for example approximately 100° C.) using a formulation of alkanesulfonic acid(s) at ambient temperature (for example 20° C.). It is also possible to envisage completely immersing the surfaces to be treated in a formulation of alkanesulfonic acid(s) brought, for example, to a temperature of approximately 60° C., for example in order to remove cement residues present on textiles, which may or may not be coated, plastic films and others.

Finally, after the stage of treatment(s) and of optional rinsing operation(s), the cleaned surface can, if appropriate and if necessary, be dried according to any method known to a person skilled in the art, for example with air, under a stream of more or less hot air, in an oven, by heating (electric, heating lamps), wiping (absorbent textiles or papers) and others.

As indicated above, the alkanesulfonic acid is advantageously employed in the form of a formulation, for example an aqueous, organic or aqueous/organic formulation, in the liquid, gel or foaming gel form, as defined above.

In the method of the invention as just described, the term "effective amount" is understood to mean an amount which makes possible the dissolution of the cement residues, scales or deposits and the removal of all traces of cement.

This amount can vary within wide limits according to the surfaces to be treated and the amount of cement, the temperature and the pressure of the formulation used, the desired duration of the removal method, and others.

Thus, the amount of acid will advantageously be worked out in order to make possible complete removal of the cement while observing a minimum amount of acid(s), essentially for economic reasons.

This operation of removal of the cement can be repeated one or more times according to the amount of cement, concrete, mortar and others to be removed and its degree of encrustation on the surfaces to be treated.

The operation of bringing into contact an effective amount of at least one alkanesulfonic acid is followed by a reaction time necessary for the dissolution of the cement which it is desired to remove, it being possible for this reaction time to vary from a few seconds to a few hours, indeed even a few days, according to the temperature at which the cleaning is carried out, the pressure of application of the alkanesulfonic acid(s), the amount of cement to be removed and its degree of encrustation, and the nature of the surfaces to be treated.

The treatment with at least one alkanesulfonic acid as just defined can optionally be accompanied and/or followed by one or more mechanical operations (agitation, scraping, brushing and others) in order to improve the acid chemical action, if necessary.

Finally, the treatment can be followed by one or more rinsing operations, for example with clear water, solvent(s) or water/solvent(s) mixture(s).

In the method of the invention as just described, the term "effective amount" is understood to mean an amount which makes possible the dissolution and the removal of all or part of the cement contaminants, residues or scales, which may or may not be dry.

This amount can vary within wide limits according to the surfaces to be treated and the amount of cement, the temperature and the pressure of the formulation used, the desired duration of the removal method, and others.

Thus, the amount of acid will advantageously be adjusted in order to make possible complete removal of the residues or scales, which are or are not dried, of cement, concrete, mortar, laitances and others while observing a minimum amount of acid(s), essentially for economic reasons.

Alkanesulfonic acids, in particular methanesulfonic acid, have been shown to be effective in the dissolution of cement and in particular of the main components of this product without generating releases of irritant and lacrimatory gases.

Furthermore, the use of at least one alkanesulfonic acid according to the present invention exhibits the advantage of generating only very little, indeed even no, corrosion, in particular during the cleaning of metal surfaces (concrete mixing plants, concrete mixers, metal formwork), which corrosion is frequently observed on said metal surfaces during the use of more or less concentrated solutions of hydrochloric acid.

The alkanesulfonic acids can also be used at high concentrations in order to increase their effectiveness, which concentrations can be 50%, 70% or indeed even 100% by weight, whereas the maximum concentration of hydrochloric acid can be at most only 37% due to the intrinsic chemical nature of this acid.

In addition, the alkanesulfonic acids used in the present invention exhibit, in comparison with arylsulfonic acids, the advantage of generating a lower oxygen demand in effluent treatment plants (Chemical Oxygen Demand, COD) and consequently of making possible a higher concentration of organic discharges in said plants.

The present invention described above shows that it is possible to remove cement on all types of surfaces, such as, without implied limitation, metal surfaces (iron, steel, copper, alloys and others) or surfaces made of concrete, cement, tiling, porcelain, wood, paper, board, textiles, polymers (plastics, varnishes, paints, lacquers), glass and others.

The present invention also shows that it is possible to clean said surfaces of undesirable residues which may or may not be dried but also to remove cement, mortar, concrete or lime which may have set solid in various containers, such as cement mixers, formwork and others, and which are usually removed by mechanical means, such as hammers, pick hammers and others.

Thus, alkanesulfonic acids can advantageously be used as replacement for the acids commonly used in the removal of cement in a large number of fields of application, among which may be mentioned, without implied limitation, the fields of construction (cement works, concrete mixers, concrete truck mixers, formwork, tiling, tiles, stone, tools and others), transportation of fluids (tubes, pipes and others), such as water, wastewater, rain water, sewage, oil, or of gas, natural gas inter alia, to mention only a few of them.

It should be understood that the use according to the present invention makes it possible not only to clean cement but also concomitantly to clean other type(s) of contaminant(s) which may be present on the surfaces to be treated, due to the acid nature of the alkanesulfonic acids used.

For example, the alkanesulfonic acids used in the context of the present invention may prove to be effective in cleaning any type of contaminant, such as rust or scale, but also any type of organic contaminant (animal feces and droppings), and others.

The present invention is now illustrated by means of the examples which follow, without exhibiting any limiting nature, and which consequently cannot be understood as capable of restricting the scope of the invention as claimed.

EXAMPLE 1

In order to assess the effectiveness of alkanesulfonic acids in the removal of cement, mortar, concrete, lime and laitances of these products, dissolution tests are carried out according to the following protocol:

A cement block is prepared, in a flat-bottomed glass flask, from 6 g of cement powder (Technocem cement, sold by Socli) and 3 g of water. The mixture is left to dry at ambient temperature for 24 hours.

100 g of aqueous acid solution (5% by weight concentration of acid in water) are poured into the flask. The flask is closed by a stopper and then placed in an agitated bath at ambient temperature for 24 hours.

The solution is subsequently filtered through a membrane filter (Acrodisc®, with a diameter of 25 mm and a porosity of 0.2 μm) and the residue is dried (overnight in an oven at 80° C.) and then weighed in order to evaluate the percentage of undissolved residual cement. The lower the amount of residual cement, the better the effectiveness of the acid tested.

The test was carried out with three 5% by weight aqueous solutions:

methanesulfonic acid (Scaleva®, sold by Arkema);
phosphoric acid (Normapur, sold by VWR); and
glycolic acid (Aldrich).

The results are present in the following table 1:

TABLE 1

| 5% by weight aqueous solution | Cement residue (% by weight with respect to the starting weight) |
|---|---|
| Scaleva ® | 59 |
| Phosphoric acid | 63 |
| Glycolic acid | 82 |

It is noticed that the alkanesulfonic acids, in particular methanesulfonic acid, exhibit an effectiveness comparable to that of phosphoric acid but without, of course, generating phosphates harmful to the environment.

It is also noticed that methanesulfonic acid is much more effective in this application than glycolic acid, used here as example of organic acid, that is to say weak acid.

What is claimed is:

1. A method for cleaning cement, mortar, concrete, calcium oxide, calcium hydroxide, or a laitance thereof from a surface which comprises
    contacting at least one alkanesulfonic acid of formula R—SO$_3$H, where R represents a saturated and linear or branched hydrocarbon chain comprising from 1 to 4 carbon atoms with the cement, mortar, concrete, the calcium oxide, the calcium hydroxide, or the laitance and then
    removing the cement, mortar, concrete, the calcium oxide, the calcium hydroxide, or the laitance from the surface.

2. The method of claim 1, wherein the at least one alkanesulfonic acid is methanesulfonic acid, ethanesulfonic acid, n-propanesulfonic acid, isopropanesulfonic acid, n-butanesulfonic acid, isobutanesulfonic acid, sec-butanesulfonic acid, tert-butanesulfonic acid, or a mixture of two or more of them in all proportions.

3. The method of claim 1, wherein the at least one alkanesulfonic acid is methanesulfonic acid or ethanesulfonic acid.

4. The method of claim 1, wherein the at least one alkanesulfonic acid is used in a formulation form a concentration of the at least one alkanesulfonic acid being between 0.01% and 100% weight by weight.

5. The method of claim 1, wherein the at least one alkanesulfonic acid is present in a formulation selected from the group consisting of an aqueous formulation, an organic formulation, or an aqueous/organic formulation.

6. The method of claim 1, wherein the at least one alkanesulfonic acid is used in combination with one or more additives selected from the group consisting of:
    hydrotropic or solubilizing or gelling agents or solvents,
    biocides or disinfectants,
    rheological or texturizing or thickening agents,
    organic or inorganic acids,
    flame retardants,
    preservatives,
    surfactants of anionic, cationic, nonionic or amphoteric type, emulsifiers, detergents, soaps and others,
    foaming or antifoaming agents,
    antifreezes;
    colorants, and
    fragrances or odorous agents.

7. The method of claim 1, wherein the at least one alkanesulfonic acid is used in the form of a liquid, gel or foaming gel formulation.

8. The method of claim 1, wherein the surface is a metal surface or a surface made of concrete, cement, tiling, tiles, stone, porcelain, wood, paper, board, textiles, polymers, or glass.

9. The method of claim 1, wherein the at least one alkanesulfonic acid is methanesulfonic acid.

10. The method of claim 1, wherein the surface is a plastic surface, a varnished surface, a painted surface, or a lacquered surface.

11. The method of claim 4, wherein the concentration of the at least one alkanesulfonic acid is between 0.05% and 90% by weight with respect to the total weight of said formulation.

12. The method of claim 4, wherein the concentration of the at least one alkanesulfonic acid is between 0.5% and 75% by weight with respect to the total weight of said formulation.

13. The method of claim 5, wherein the formulation is concentrated, ready for use, or to be diluted before use.

14. The method of claim 6, wherein
    the hydrotropic or solubilizing or gelling agents or solvents are selected from the group consisting of alcohols, esters, ketones, and amides.

15. The method of claim 6, wherein
the biocides or disinfectants are selected from the group consisting of bromoacetic acid, peracetic acid, and aqueous hydrogen peroxide solution.

16. The method of claim 6, wherein
the rheological or texturizing or thickening agents are selected from the group consisting of sugars, polysaccharides, alginates, silica, amorphous silica, and gums.

17. The method of claim 6, wherein
the organic or inorganic acids are selected from the group consisting of sulfuric acid, phosphoric acid, nitric acid, sulfamic acid, acetic acid, citric acid, formic acid, lactic acid, glycolic acid, and oxalic acid.

18. The method of claim 6, wherein
the surfactants of anionic, cationic, nonionic or amphoteric type are selected from the group consisting of ethoxylated alcohols, amines, alkylsulfonates, and arylsulfonates.

19. The method of claim 6, wherein
the antifreezes are selected from the group consisting of ethylene glycol and propylene glycol.

20. The method of claim 8, wherein the metal surface is made of iron, steel, copper, or an alloy.

\* \* \* \* \*